US012391499B2

(12) United States Patent
Ishido et al.

(10) Patent No.: US 12,391,499 B2
(45) Date of Patent: Aug. 19, 2025

(54) IMAGE FORMING APPARATUS

(71) Applicant: KYOCERA Document Solutions Inc., Osaka (JP)

(72) Inventors: Kohei Ishido, Osaka (JP); Kotaro Ogawa, Osaka (JP); Haruna Takamura, Osaka (JP); Yuta Ikeda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 198 days.

(21) Appl. No.: 18/354,054

(22) Filed: Jul. 18, 2023

(65) Prior Publication Data

US 2024/0025682 A1 Jan. 25, 2024

(30) Foreign Application Priority Data

Jul. 19, 2022 (JP) ................................. 2022-114806

(51) Int. Cl.

*B65H 7/14* (2006.01)
*B65H 7/10* (2006.01)
*G03G 15/00* (2006.01)

(52) U.S. Cl.

CPC ................. *B65H 7/14* (2013.01); *B65H 7/10* (2013.01); *G03G 15/5062* (2013.01); *G03G 15/6567* (2013.01); *B65H 2301/531* (2013.01); *B65H 2511/521* (2013.01); *B65H 2553/45* (2013.01); *B65H 2601/2611* (2013.01); *G03G 2215/00616* (2013.01)

(58) Field of Classification Search

CPC ... B65H 7/06; B65H 7/08; B65H 7/10; B65H 7/14; B65H 2301/531; B65H 2511/521; B65H 2553/45; B65H 2601/2611; G03G 15/5062; G03G 15/6567; G03G 2215/00616

See application file for complete search history.

(56) References Cited

U.S. PATENT DOCUMENTS

| | | | | |
|---|---|---|---|---|
| 2012/0269563 A1* | 10/2012 | Ui | .......................... | B65H 9/006 399/367 |
| 2015/0261161 A1* | 9/2015 | Waida | ................ | G03G 15/5029 399/45 |
| 2016/0221778 A1* | 8/2016 | Ueda | ........................ | B65H 7/20 |
| 2021/0024313 A1* | 1/2021 | Cho | .......................... | B41J 29/17 |
| 2021/0173334 A1* | 6/2021 | Ishido | ................ | H04N 1/32609 |

FOREIGN PATENT DOCUMENTS

| | | |
|---|---|---|
| JP | 2022044379 A | 3/2022 |

* cited by examiner

*Primary Examiner* — Prasad V Gokhale

(74) *Attorney, Agent, or Firm* — Alleman Hall & Tuttle LLP

(57) ABSTRACT

An image forming apparatus is capable of correcting a lateral deviation and/or a skew of a sheet. A pair of conveying rollers convey the sheet to a transfer position of an image. An image sensor reads the sheet on an upstream side of the transfer position in a sheet conveying direction. A control device senses a foreign substance on a reading surface of the image sensor as well as calculate a lateral deviation amount and/or a skew amount of the sheet based on an output signal of the image sensor.

6 Claims, 10 Drawing Sheets

IMAGE FORMING APPARATUS

INCORPORATION BY REFERENCE

This application is based upon and claims the benefit of priority from the corresponding Japanese Patent Application No. 2022-114806 filed on Jul. 19, 2022, the entire contents of which are incorporated herein by reference.

BACKGROUND

The present disclosure relates to an image forming apparatus.

An image forming apparatus is known to include a registration unit arranged in the middle of a sheet conveying path. The registration unit includes a pair of registration rollers arranged so as to sandwich the conveying path. The registration unit further includes an image sensor which senses a skew or a positional deviation of a sheet.

The registration unit is disposed on an upstream side of a transfer position. The registration unit causes the sheet to stand by using the pair of registration rollers, and corrects the skew or positional deviation of the sheet.

In addition, the registration unit feeds the sheet from the pair of registration rollers toward the transfer position in accordance with a timing of an image forming operation.

SUMMARY

An image forming apparatus according to one aspect of the present disclosure is an image forming apparatus capable of correcting a lateral deviation and/or a skew of a sheet. The image forming apparatus includes a pair of conveying rollers, an image sensor, and a control device. The pair of conveying rollers convey the sheet to a transfer position of an image. The image sensor reads the sheet on an upstream side of the transfer position in a sheet conveying direction. The control device processes an output signal of the image sensor. The control device senses a foreign substance on a reading surface of the image sensor as well as calculate a lateral deviation amount and/or a skew amount of the sheet based on the output signal of the image sensor.

In the image forming apparatus, in a case where the output signal obtained during one scan of the image sensor includes a plurality of rising edges or falling edges while the sheet is being conveyed, the control device may sense the foreign substance on the reading surface of the image sensor.

In the image forming apparatus, in a case where the output signal obtained during one scan of the image sensor includes at least one rising edge or falling edge when the sheet is not conveyed, the control device may sense the foreign substance on the reading surface of the image sensor.

The image forming apparatus may further include a cleanup device which cleans the reading surface of the image sensor.

In the image forming apparatus, in a case where the control device senses the foreign substance on the reading surface of the image sensor after the cleanup device has cleaned the reading surface of the image sensor, the cleanup device may re-clean the reading surface of the image sensor.

In the image forming apparatus, the image sensor may include a plurality of light-receiving elements arranged along a main scanning direction, and the cleanup device may include a cleanup roller which rotates about a rotation shaft arranged along the main scanning direction. In this case, the cleanup device causes the cleanup roller to rotate, to clean the reading surface of the image sensor.

In the image forming apparatus, the image sensor may include a plurality of light-receiving elements arranged along a main scanning direction, and the cleanup device may include a cleanup body movable in the main scanning direction. In this case, the cleanup device causes the cleanup body to reciprocate, to clean the reading surface of the image sensor.

In the image forming apparatus, the control device may sense a position of the foreign substance on the reading surface of the image sensor based on the output signal of the image sensor. In this case, the cleanup device causes the cleanup body to reciprocate in a partial region including the position of the foreign substance on the reading surface of the image sensor.

The image forming apparatus may further include a notification device which notifies information related to an image forming operation. In this case, the control device may derive a size of the foreign substance based on the output signal of the image sensor. Further, the control device may notify, in a case where the size of the foreign substance exceeds a predetermined size, information that prompts to check the reading surface of the image sensor via the notification device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

First Embodiment

Hereinafter, the present embodiment will be described with reference to the drawings. It is noted that in descriptions below, a printer 1 is an example of an image forming apparatus.

Figure 1:
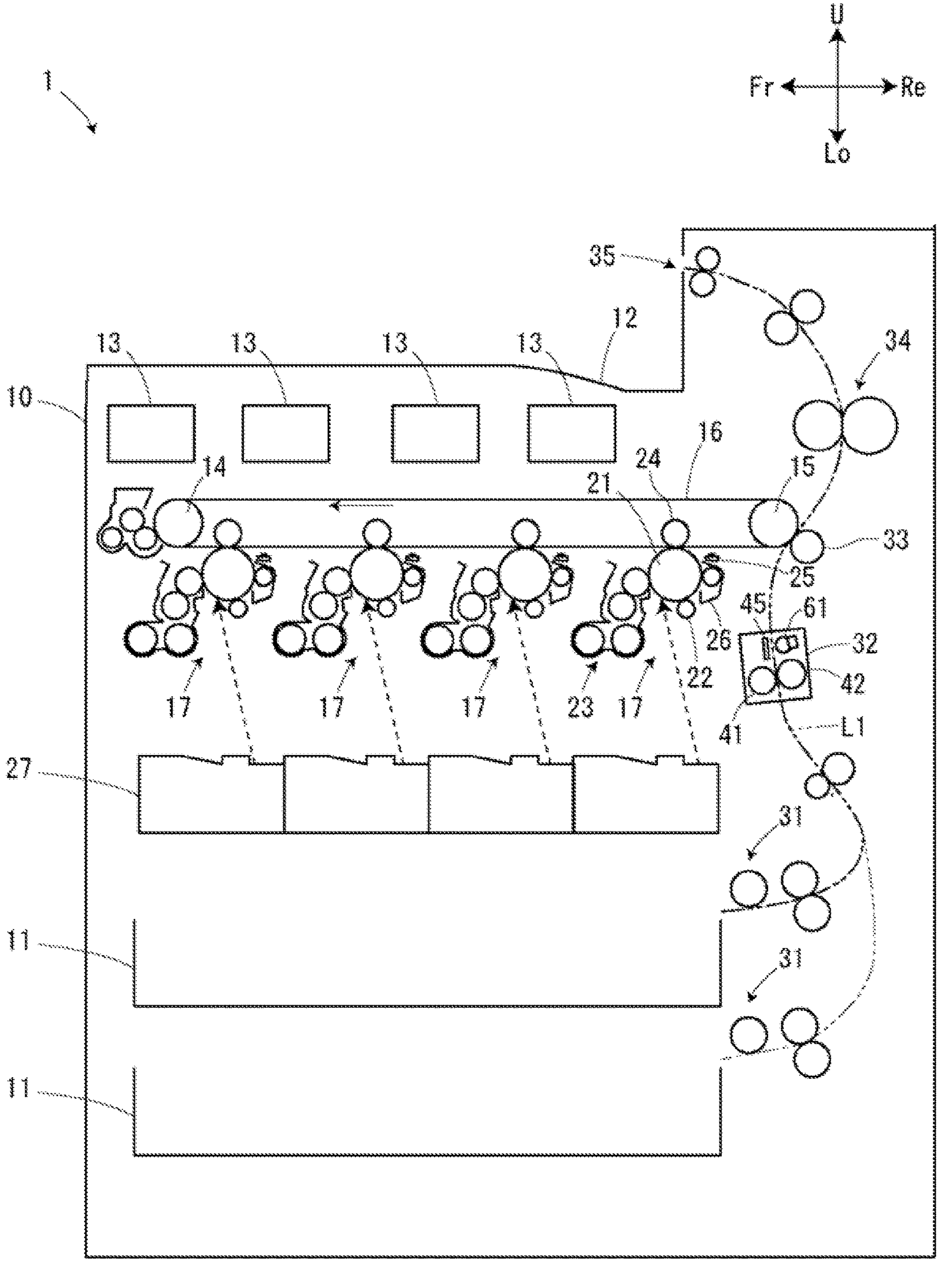
FIG. 1 is a schematic diagram of a printer according to a first embodiment.

FIG. 1 is a schematic diagram of a printer according to the present embodiment. It is noted that in FIG. 1, arrows Fr, Re, U, and Lo respectively indicate a front side, rear side, upper side, and lower side of the printer.

As shown in FIG. 1, the printer 1 includes a box-like housing 10 that houses various types of equipment. A plurality of sheet feed cassettes 11 in each of which a stack of sheets are set are housed at a lower portion of the housing 10. A sheet discharge tray 12 is provided at an upper portion of the housing 10. A sheet formed with an image is stacked on the sheet discharge tray 12.

A plurality of toner containers 13 are detachably attached at a portion below the sheet discharge tray 12 in the housing 10. The plurality of toner containers 13 respectively store different colors of toner.

For example, the colors of toner are four colors including magenta, cyan, yellow, and black. An intermediate transfer belt 16 is bridged across a pair of rollers 14 and 15 below the plurality of toner containers 13.

On a lower side of the intermediate transfer belt 16, a plurality of image forming units 17 are arranged next to one another along a moving direction of a lower surface portion of the intermediate transfer belt 16. Each of the image forming units 17 includes a photoconductor drum 21 that is rotatably supported while being in contact with the intermediate transfer belt 16.

Each of the image forming units 17 includes a charging device 22, a developing device 23, a primary transfer roller 24, a neutralization portion 25, and a cleaning device 26 that are arranged in a periphery of the photoconductor drum 21. A waste toner box (not shown) is connected to the cleaning device 26.

An exposure unit 27 is arranged below the plurality of image forming units 17. The exposure unit 27 is a laser scanning unit (LSU).

A conveying path L1 is formed at a side portion inside the housing 10. The conveying path L1 is a path on which a sheet is conveyed by a plurality of rollers from the sheet feed cassettes 11 to the sheet discharge tray 12.

Sheet feed portions 31 are provided on an upstream side of the conveying path L1 in a sheet conveying direction. In the example shown in FIG. 1, the sheet feed portions 31 are provided on a lower side of the conveying path L1.

A registration unit 32 is provided at a position on a downstream side of the sheet feed portions 31 on the conveying path L1 in the sheet conveying direction. A secondary transfer roller 33 is provided at a position on a downstream side of the registration unit 32 on the conveying path L1 in the sheet conveying direction. The secondary transfer roller 33 is in contact with a side end of the intermediate transfer belt 16.

A fixing device 34 is provided at a position on a downstream side of the secondary transfer roller 33 on the conveying path L1 in the sheet conveying direction. Further, a sheet discharge port 35 is provided at an end of the conveying path L1 on a downstream end side in the sheet conveying direction.

In image forming processing by the printer 1, the charging device 22 charges a surface of the photoconductor drum 21. Further, the exposure unit 27 scans laser light to thus form an electrostatic latent image on the surface of the photoconductor drum 21.

Next, the developing device 23 supplies toner to the surface of the photoconductor drum 21. Thus, the toner adheres onto the electrostatic latent image, and a toner image is thus formed on the surface of the photoconductor drum 21.

Furthermore, the toner image is primarily transferred onto a surface of the intermediate transfer belt 16 from the surface of the photoconductor drum 21. By the toner images of the respective colors being primarily transferred onto the intermediate transfer belt 16 in the respective image forming units 17, a full-color toner image is formed on the surface of the intermediate transfer belt 16.

Charges and waste toner remaining on the photoconductor drum 21 are removed by the neutralization portion 25 and the cleaning device 26.

Meanwhile, the sheet feed portion 31 feeds a sheet from the sheet feed cassette 11, and the registration unit 32 feeds the sheet toward the secondary transfer roller 33. Further, the secondary transfer roller 33 secondarily transfers the full-color toner image onto a surface of the sheet from the surface of the intermediate transfer belt 16. The sheet onto which the toner image has been transferred is conveyed toward the fixing device 34 on the downstream side by the secondary transfer roller 33.

The fixing device 34 fixes the toner image onto the sheet. The sheet onto which the toner image has been fixed is discharged onto the sheet discharge tray 12 from the sheet discharge port 35. In this manner, the sheet onto which the toner image has been transferred is passed through the fixing device 34 so that an image is formed on the surface of the sheet.

Incidentally, the registration unit 32 includes a pair of registration rollers 41 and 42, an image sensor 45, and a cleanup device 61. The image sensor 45 senses a sheet edge for sensing a lateral deviation of a sheet. The pair of registration rollers 41 and 42 are a pair of conveying rollers.

Figure 2:
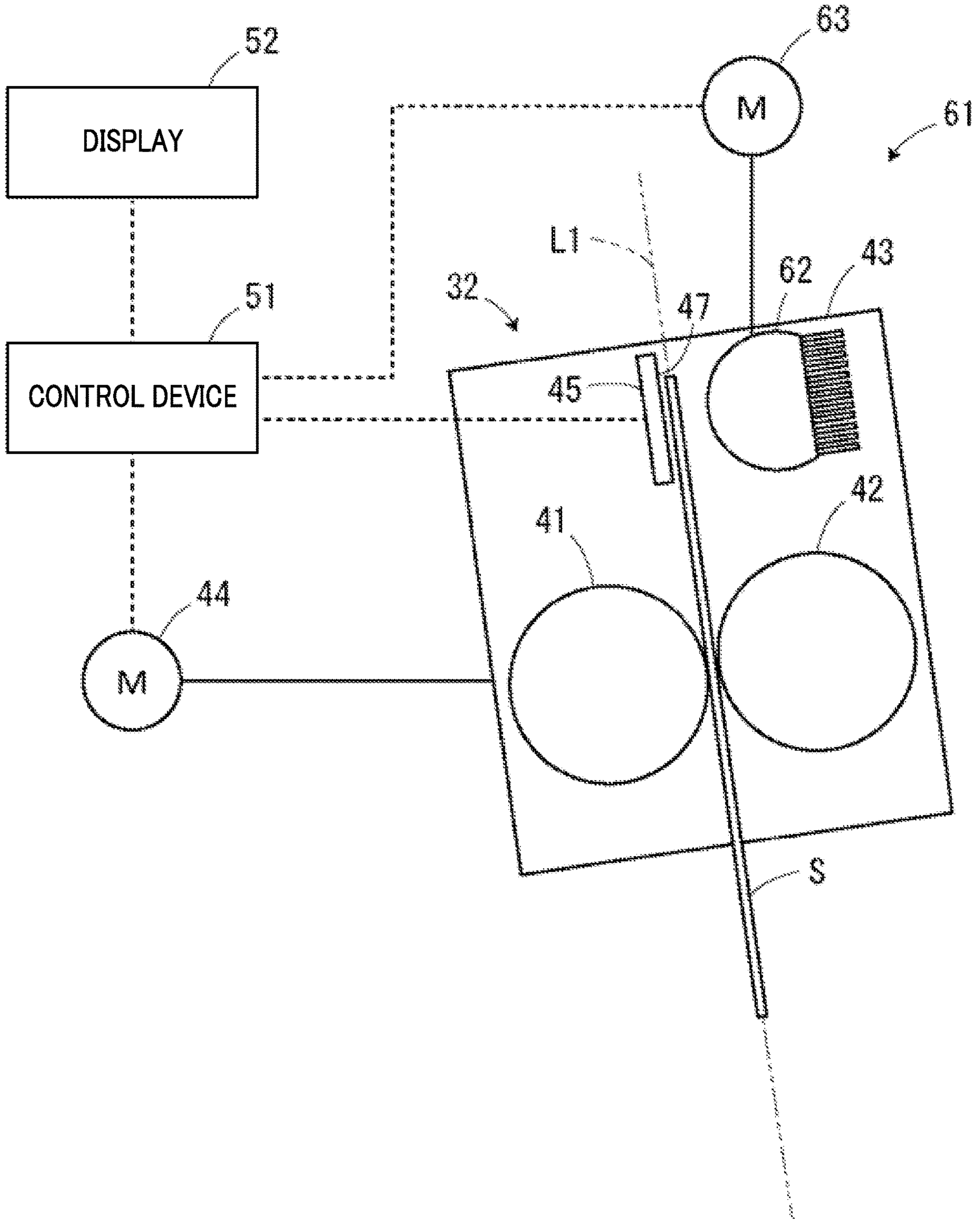
FIG. 2 is a schematic diagram showing a configuration of equipment related to cleanup processing in the printer according to the first embodiment.

The cleanup device 61 cleans a reading surface 47 of the image sensor 45 (see FIG. 2). The reading surface 47 is a glass surface. A foreign substance adhered onto the reading surface 47 of the image sensor 45 becomes a cause of false sensing of a sheet edge.

In the present embodiment, the printer 1 uses a reading function of the image sensor 45 to sense a foreign substance on the reading surface 47 of the image sensor 45. In addition, the printer 1 removes the foreign substance from the reading surface 47 of the image sensor 45 by the cleanup device 61.

Cleanup processing for cleaning the image sensor 45, that is executed in the printer 1 will be described with reference to FIG. 2 to FIG. 7.

Figure 3:
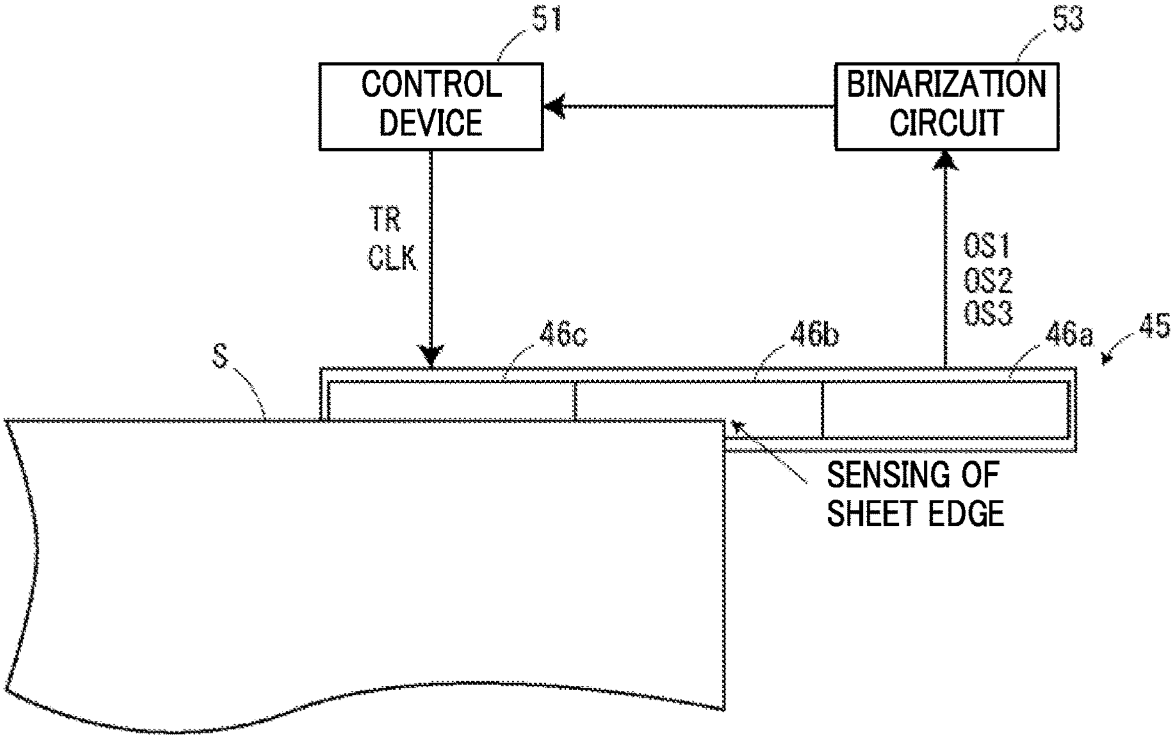
FIG. 3 is a schematic diagram showing a configuration of equipment related to control of an image sensor in the printer according to the first embodiment.
Figure 4:
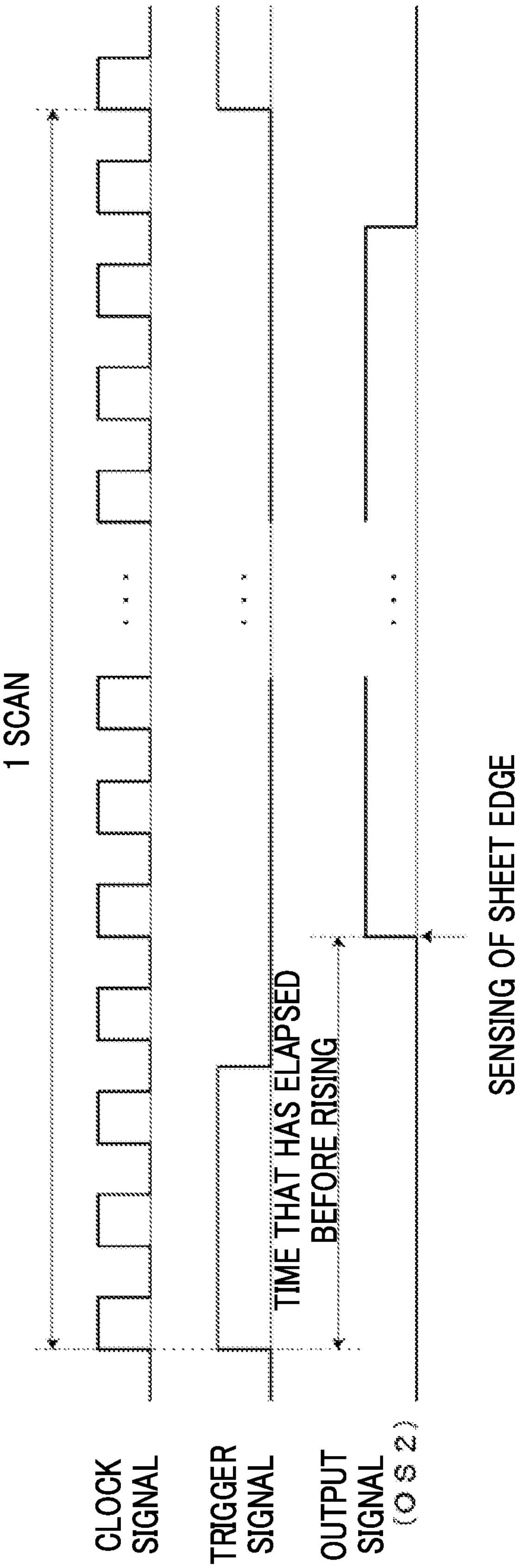
FIG. 4 is an example of a time chart of various signals obtained when a sheet edge is sensed in the printer according to the first embodiment.
Figure 5:
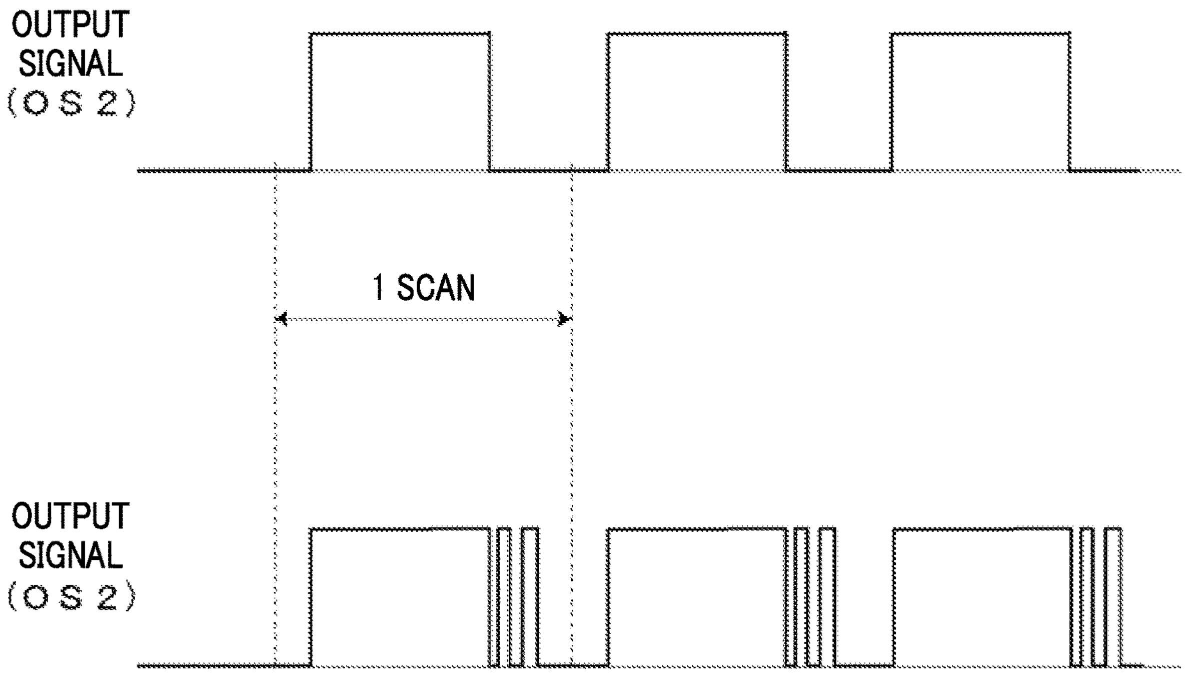
FIG. 5 is an example of a time chart of an output signal of the image sensor obtained when a sheet is conveyed in the printer according to the first embodiment.
Figure 6:
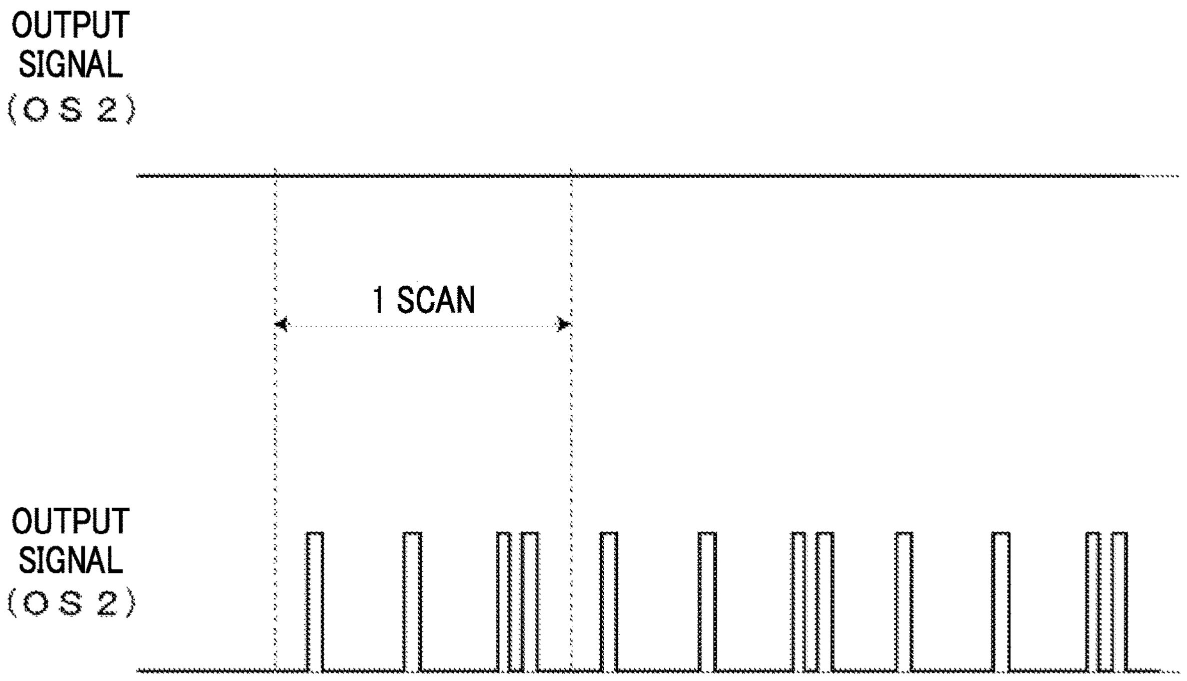
FIG. 6 is an example of a time chart of the output signal of the image sensor obtained when a sheet is not conveyed in the printer according to the first embodiment.
Figure 7A:
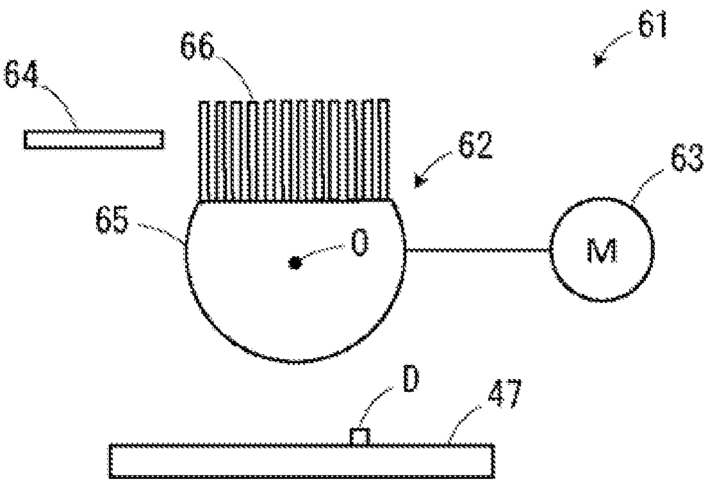
FIG. 7A is a diagram showing a first state of a cleanup device in the printer according to the first embodiment.
Figure 7B:
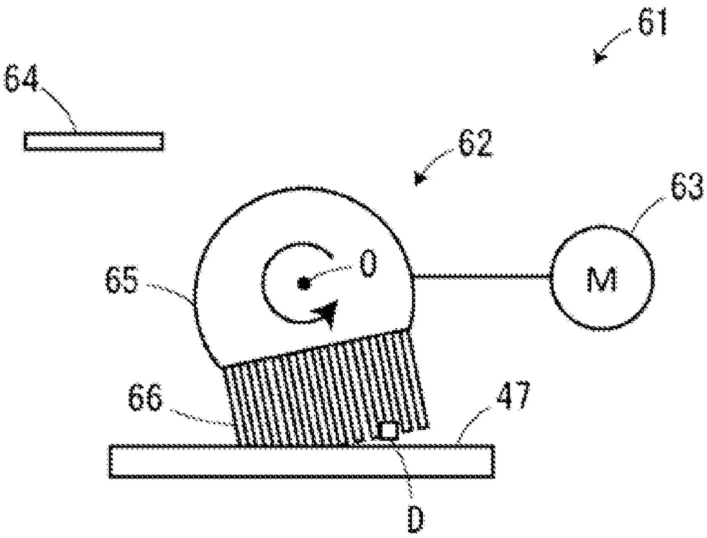
FIG. 7B is a diagram showing a second state of the cleanup device in the printer according to the first embodiment.
Figure 7C:
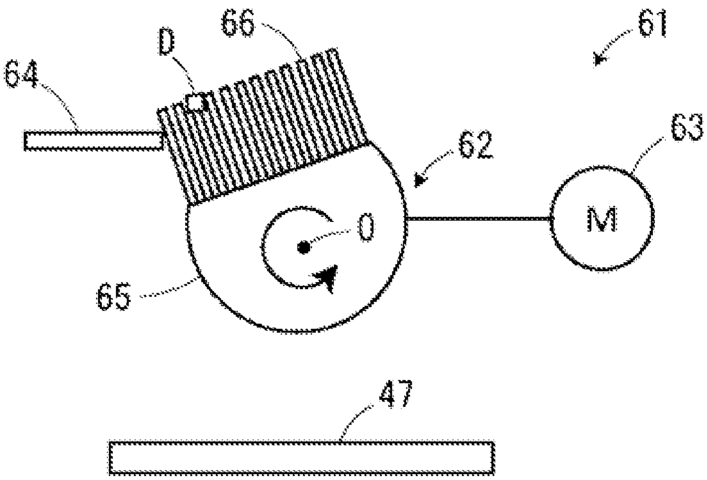
FIG. 7C is a diagram showing a third state of the cleanup device in the printer according to the first embodiment.

FIG. 2 is a schematic diagram showing a configuration of equipment related to the cleanup processing. FIG. 3 is a schematic diagram showing a configuration of equipment related to control of the image sensor 45. FIG. 4 is an example of a time chart of various signals obtained when a sheet edge is sensed. FIG. 5 is an example of a time chart of an output signal of the image sensor 45 obtained when a sheet is being conveyed. FIG. 6 is an example of a time chart of the output signal of the image sensor 45 obtained when a sheet is not conveyed. FIG. 7A to FIG. 7C are transition diagrams of a cleaning operation of the cleanup device 61.

As shown in FIG. 2, the registration unit 32 includes the pair of registration rollers 41 and 42 arranged so as to sandwich the conveying path L1 of a sheet S. By a tip end of the sheet S coming into contact with the pair of registration rollers 41 and 42, a skew of the sheet S is corrected.

By a movement of a unit case 43 in a lateral direction, the pair of registration rollers 41 and 42 supported by the unit case 43 correct a lateral deviation of the sheet S.

The pair of registration rollers 41 and 42 correct a skew of the sheet S before the sheet S reaches a secondary transfer position. The secondary transfer position is a position of the secondary transfer roller 33 (see FIG. 1). In addition, the pair of registration rollers 41 and 42 convey the sheet S to the secondary transfer position while correcting the lateral deviation of the sheet S.

The cleanup device 61 includes a cleanup roller 62. The image sensor 45 and the cleanup roller 62 are arranged so as to sandwich the conveying path L1 at positions on a downstream side of the pair of registration rollers 41 and 42 and also on an upstream side of the secondary transfer position.

For example, a CIS (Contact Image Sensor) is used as the image sensor 45. A back surface of the cleanup roller 62 is black. The cleanup roller 62 is held such that the back surface thereof faces the image sensor 45 when the cleanup processing is not carried out.

When the sheet S is not conveyed, sensing light emitted from the image sensor 45 is absorbed by the back surface of the cleanup roller 62 and black surfaces around the cleanup roller 62.

When the sheet S passes between the image sensor 45 and the cleanup roller 62, the sensing light is reflected by a white surface of the sheet S, and the image sensor 45 receives the reflected light to read a state of the sheet S.

A foreign substance D such as paper dust and a smudge (see FIG. 7) may adhere onto the reading surface 47 of the image sensor 45.

The sensing light emitted from the image sensor 45 is absorbed by the black back surface of the cleanup roller 62 and the like in regions excluding a position at which the foreign substance D has adhered on the reading surface 47. On the other hand, the sensing light is reflected at the position at which the foreign substance D has adhered on the reading surface 47.

When the sheet S is being conveyed and when the sheet S is not conveyed, the image sensor 45 receives the reflected light that has been reflected by the foreign substance D. Thus, the image sensor 45 outputs a signal of a level corresponding to an amount of the reflected light. The output signal of the image sensor 45 is used for sensing the foreign substance D on the reading surface 47 of the image sensor 45.

The output signal of the image sensor 45 is processed by a control device 51. The control device 51 senses coordinates of a sheet edge based on the output signal of the image sensor 45. The control device 51 further calculates a difference between the sensed coordinates of the sheet edge and reference coordinates of the sheet edge, to thus calculate a lateral deviation amount of the sheet S.

Coordinates that have been sensed in a state where there is no lateral deviation of the sheet S are preset as the reference coordinates of the sheet edge. Moreover, the control device 51 senses a foreign substance D on the reading surface 47 of the image sensor 45 based on a signal waveform of the output signal of the image sensor 45. Furthermore, when the foreign substance D is sensed, the control device 51 causes the cleanup device 61 to execute the cleanup processing. The cleanup processing is processing of cleaning the reading surface 47 of the image sensor 45.

The control device 51 is connected to a registration motor 44 that causes the unit case 43 to move in the lateral direction. When the lateral deviation amount of the sheet S is calculated, the control device 51 causes the registration motor 44 to execute an operation of moving the unit case 43 in a direction of correcting the lateral deviation.

Further, the control device 51 is also connected to a cleanup motor 63 that causes the cleanup roller 62 to rotate. When the foreign substance D on the reading surface 47 is sensed, the control device 51 operates the cleanup motor 63 to cause the cleanup roller 62 to rotate. Thus, the foreign substance D on the reading surface 47 is removed. By removing the foreign substance D on the reading surface 47, false sensing of the lateral deviation amount of the sheet S is prevented from occurring.

The control device 51 is also connected to a display 52 that displays and notifies various types of information related to the image forming operation of the sheet S. The display 52 is an example of a notification device which notifies information. When an uncleanable foreign substance D is on the reading surface 47 of the image sensor 45, the control device 51 outputs a notification signal to the display 52.

Based on the notification signal, the display 52 displays a message expressing information that prompts to check the reading surface 47. A worker checks the reading surface 47 of the image sensor 45 according to the message, and removes the foreign substance D that cannot be removed by the cleanup device 61.

It is noted that the control device 51 may be realized by software using a processor, or may be realized by hardware such as a logic circuit formed in an integrated circuit or the like.

When the processor is used, the processor reads programs stored in a memory and executes the programs, to thus execute various types of processing. For example, a CPU (Central Processing Unit) is used as the processor. The memory is constituted by one or a plurality of storage devices selected from a ROM (Read Only Memory), a RAM (Random Access Memory), and the like according to the intended use.

As shown in FIG. 3, the image sensor 45 is arranged at a position biased with respect to the position of the sheet S in the lateral direction. The sensing surface of the image sensor 45 is sectioned into first to third sensing blocks 46*a* to 46*c*. Each of the first to third sensing blocks 46*a* to 46*c* includes a plurality of photoelectric conversion elements arranged in line in a main scanning direction.

A trigger signal and a clock signal output from the control device 51 are input to the image sensor 45. The first to third sensing blocks 46*a* to 46*c* start reading a state of the sheet S in sync with the trigger signal. In addition, the first to third sensing blocks 46*a* to 46*c* each output a pixel signal per element to a binarization circuit 53 in sync with the clock signal.

A light source of the image sensor 45 emits the sensing light, and the sensing light is reflected by the sheet S or the foreign substance D. The plurality of photoelectric conversion elements of the first to third sensing blocks 46*a* to 46*c* receive the reflected light.

The plurality of photoelectric conversion elements of the first to third sensing blocks 46*a* to 46*c* each output an analog sensing signal to the binarization circuit 53. The binarization circuit 53 converts the analog sensing signal into a digital signal, and outputs the digital signal to the control device 51 as the output signal of the image sensor 45. As described above, the image sensor 45 reads the state of the sheet S and the foreign substance D, and the output signal of the image sensor 45 is output to the control device 51 via the binarization circuit 53.

As shown in FIG. 4, an input time interval of the trigger signal is a one-scan period. The output signal of the image sensor 45 is output in sync with the clock signal. The output signal of the sensing block corresponding to a position that the sheet edge passes through out of the first to third sensing blocks 46*a* to 46*c* is used for sensing the lateral deviation of the sheet S.

For example, when a size of the sheet S is an A4 size, a second output signal OS2 as an output signal of the second sensing block 46*b* is used for sensing the lateral deviation of the sheet S. The control device 51 counts the number of clocks of the clock signal between a rising edge of the trigger signal and a rising edge of the output signal, to thus sense the coordinates of the sheet edge.

In addition, the control device 51 calculates a difference of the sensed coordinates of the sheet edge from the reference coordinates of the sheet edge corresponding to the size of the sheet S, to thus calculate the lateral deviation amount.

As shown in FIG. 5, when the sheet S is being conveyed, the image sensor 45 outputs a signal corresponding to the reflected light that has been reflected by the sheet S and the foreign substance D.

The time chart on an upper side of FIG. 5 shows an output signal obtained when the sheet S is conveyed in a state where no foreign substance D is adhered onto the reading surface 47 of the image sensor 45. When no foreign substance D is adhered, the output signal obtained during one scan includes one rising edge or falling edge.

The time chart on a lower side of FIG. 5 shows an output signal obtained when the sheet S is conveyed in a state where the foreign substance D is adhered onto the reading surface 47 of the image sensor 45. When the foreign substance D is adhered, the output signal obtained during one scan includes a plurality of rising edges or a plurality falling edges.

As shown in FIG. 6, when the sheet S is not conveyed, the image sensor 45 outputs a signal corresponding to the reflected light that has been reflected by the foreign substance D. For example, the sheet S is not conveyed when power is turned on, when the printer 1 resumes from a sleep state, when the printer 1 is in a standby state, right after a cover of the printer 1 is opened/closed, and the like.

The time chart on an upper side of FIG. 6 shows an output signal obtained when the sheet S is not conveyed in a state where no foreign substance D is adhered onto the reading surface 47 of the image sensor 45. When no foreign substance D is adhered, the output signal obtained during one scan does not include a rising edge nor a falling edge.

The time chart on a lower side of FIG. 6 shows an output signal obtained when the sheet S is not conveyed in a state where the foreign substance D is adhered onto the reading surface 47 of the image sensor 45. When the foreign substance D is adhered, the output signal obtained during one scan includes at least one rising edge or falling edge.

When the output signal obtained during one scan includes one rising edge or falling edge while the sheet S is being conveyed, the control device 51 does not sense a foreign substance D on the reading surface 47.

When the output signal obtained during one scan includes a plurality of rising edges or falling edges while the sheet S is being conveyed, the control device 51 senses a foreign substance D on the reading surface 47.

When the output signal obtained during one scan does not include a rising edge nor a falling edge while the sheet S is being conveyed, the control device 51 senses a foreign substance D on the reading surface 47.

When the output signal obtained during one scan includes at least one rising edge or falling edge while the sheet S is being conveyed, the control device 51 senses a foreign substance D on the reading surface 47.

Furthermore, the control device 51 derives a foreign substance size based on the number of clocks between the rising edge and the falling edge in the output signal.

When the foreign substance D is sensed while the sheet S is being conveyed, the control device 51 causes the cleanup device 61 to execute the cleanup processing after a printing job is ended or at other timings at which the printing job stops. The timing at which the printing job stops is a timing at which calibration or the like is executed, for example.

When the foreign substance D is sensed while the sheet S is being conveyed, the control device 51 causes the cleanup device 61 to execute the cleanup processing before the next printing job is executed.

However, when the derived foreign substance size is equal to or larger than a predetermined size, the control device 51 does not cause the cleanup device 61 to execute the cleanup processing. In this case, the control device 51 causes the display 52 to display a message that prompts a user to check the reading surface 47 of the image sensor 45. This situation is a situation where it is determined by the control device 51 that the sensed foreign substance D is an uncleanable foreign substance D.

As shown in FIG. 7A, the cleanup device 61 includes the cleanup roller 62, the cleanup motor 63, and a cleanup blade 64. A rotation shaft O of the cleanup roller 62 is arranged along the main scanning direction. The cleanup motor 63 causes the cleanup roller 62 to rotate. The cleanup blade 64 is a long blade arranged along the cleanup roller 62.

A roller shaft 65 of the cleanup roller 62 has a D-cut shape in which a part of a circular outer circumferential surface is cut out in a planar shape. A cleanup brush 66 having a plurality of bristles is planted at a planar portion of the roller shaft 65.

Power from the cleanup motor 63 is transmitted to the cleanup roller 62. It is noted that a configuration in which the registration motor 44 usually rotates in a forward direction, and when the registration motor 44 rotates in an opposite direction, power of the registration motor 44 is transmitted to the cleanup roller 62, is also possible. A tip end of the cleanup blade 64 is arranged on a movement locus of a tip end of the cleanup brush 66.

When the cleanup roller 62 is at a home position, the cleanup brush 66 faces a side opposite to the reading surface 47 of the image sensor 45. Thus, the black back surface of the cleanup roller 62 faces the reading surface 47 of the image sensor 45.

When the cleanup roller 62 is at the home position, a situation where the sheet S being conveyed gets caught in the cleanup brush 66 and a situation where the cleanup brush 66 is sensed by the image sensor 45 are avoided.

It is noted that an absorption sheet may be attached onto the back surface of the cleanup roller 62. The absorption sheet prevents the sensing light emitted from the image sensor 45 from being reflected. Similarly, black paint may be applied onto the back surface of the cleanup roller 62.

As shown in FIG. 7B, when the foreign substance D on the reading surface 47 is sensed based on the output signal of the image sensor 45, the cleanup motor 63 operates, and power of the cleanup motor 63 is transmitted to the cleanup roller 62. The cleanup roller 62 rotates counterclockwise about the rotation shaft O from the home position.

When the cleanup roller 62 rotates approximately 180 degrees from the home position, the tip end of the cleanup brush 66 comes into sliding contact with the reading surface 47 of the image sensor 45. The foreign substance D is removed from the reading surface 47 by the tip end of the cleanup brush 66. Further, in a state where the foreign substance D is adhered onto the tip end of the cleanup brush 66, the cleanup roller 62 rotates toward the home position.

As shown in FIG. 7C, when the cleanup roller 62 rotates beyond the home position, the tip end of the cleanup brush 66 comes into contact with the cleanup blade 64. The cleanup blade 64 is arranged on a downstream side of the home position in a rotation direction of the cleanup brush 66.

By the tip end of the cleanup brush 66 passing through the cleanup blade 64, the foreign substance D is removed from the cleanup brush 66 by the cleanup blade 64. The cleanup blade 64 recovers the foreign substance D from the cleanup brush 66. Thus, a situation where the foreign substance D adheres onto the reading surface 47 of the image sensor 45 again from the cleanup brush 66 is suppressed. In this manner, when the foreign substance D is sensed on the reading surface 47 of the image sensor the reading surface 47 of the image sensor 45 is automatically cleaned.

The control device 51 may sense the foreign substance D on the reading surface 47 of the image sensor 45 again after the cleanup device 61 has cleaned the reading surface 47 of the image sensor 45. In this case, the cleanup device 61 re-cleans the reading surface 47 of the image sensor 45.

The foreign substance D is removed as the cleanup device 61 repeats the cleaning of the reading surface 47 of the image sensor 45. The foreign substance D may be sensed even when the cleanup device 61 repeats the cleaning of the reading surface 47 of the image sensor 45. In this case, the control device 51 causes the display 52 to display a message that prompts to check the reading surface 47.

Figure 8:
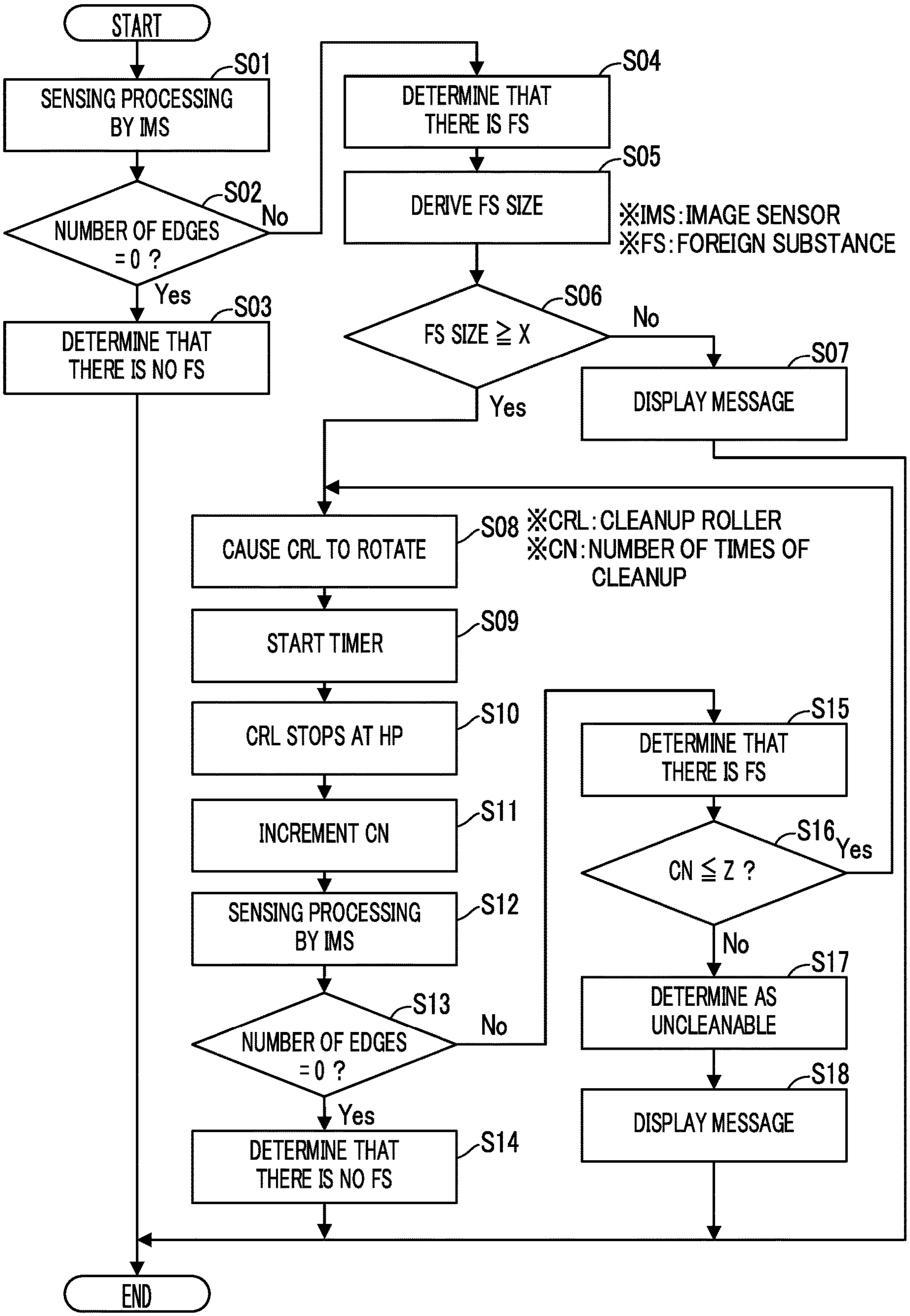
FIG. 8 is a flowchart showing an example of procedures of the cleanup processing in the printer according to the first embodiment.

The cleanup processing will be described with reference to FIG. 8. FIG. 8 is a flowchart showing an example of the cleanup processing in the first embodiment. Hereinafter, the reference symbols shown in FIG. 2 will be used in the descriptions as appropriate.

The flowchart shown in FIG. 8 is a mere example and can be changed as appropriate. FIG. 8 shows an example of sensing processing of a foreign substance D when the sheet S is not conveyed. The sensing processing of a foreign substance D may also be executed when the sheet S is being conveyed.

As shown in FIG. 8, when the sheet S is being conveyed, sensing processing by the image sensor 45 is carried out (Step S01). Thus, the image sensor 45 outputs a signal to the control device 51. In descriptions below, the number of rising edges included in the output signal obtained during one scan, that is output from the image sensor 45, will be referred to as the number of edges.

When the number of edges in the output signal is 0 (Yes in Step S02), the control device 51 determines that there is no foreign substance, and ends the processing (Step S03). When the number of edges is one or more (No in Step S02), the control device 51 determines that there is a foreign substance (Step S04).

Next, the control device 51 derives a size of the foreign substance based on the number of clocks between the rising edge and the falling edge (Step S05). When the foreign substance size is larger than a predetermined size X (No in Step S06), the control device 51 causes the display 52 to display a message that prompts the user to check the reading surface 47 of the image sensor 45 (Step S07). Thus, the foreign substance D that cannot be cleaned by the cleanup roller 62 is manually removed from the reading surface 47.

When the foreign substance size is equal to or smaller than the predetermined size X (Yes in Step S06), the control device 51 operates the cleanup motor 63 to cause the cleanup roller 62 to rotate (Step S08).

From a time point the cleanup roller 62 starts rotating, the control device 51 starts counting a cleanup time using a timer (Step S09). The reading surface 47 of the image sensor 45 is cleaned by the rotation of the cleanup roller 62. When the cleanup time reaches a predetermined time Y, the control device 51 stops the cleanup roller 62 (Step S10). Thus, the cleanup roller 62 stops at the home position, and cleaning of the reading surface 47 by the cleanup roller 62 ends.

Next, the control device 51 increments the number of times of cleanup (Step S11). Further, the sensing processing by the image sensor 45 is carried out (Step S12). Thus, the image sensor 45 outputs a signal to the control device 51.

When the number of edges in the output signal is 0 (Yes in Step S13), the control device 51 determines that there is no foreign substance, and ends the processing (Step S14). When the number of edges is one or more (No in Step S13), the control device 51 determines that there is a foreign substance (Step S15).

When the number of times of cleanup is equal to or smaller than a predetermined number of times of cleanup Z (Yes in Step S16), the control device 51 repeats the processing from Step S08 to Step S13.

When the number of times of cleanup is larger than the predetermined number of times of cleanup Z (No in Step S16), the control device 51 determines that the foreign substance D is uncleanable (Step S17). In addition, the control device 51 causes the display 52 to display a message that prompts the user to check the reading surface 47 of the image sensor 45 (Step S18). Thus, the user is prompted to check a smudge or scratch on the reading surface 47 that cannot be removed by the cleanup roller 62, to replace the image sensor 45 or the registration unit 32, and the like. It is noted that in the printer 1, arbitrary values can be set for the predetermined size X, the predetermined time Y, and the predetermined number of times of cleanup Z.

As described above, according to the first embodiment, the image sensor 45 can be used to sense the foreign substance D on the reading surface 47 based on the output signal of the image sensor 45. By removing the foreign substance D on the reading surface 47 of the image sensor 45, false sensing of a lateral deviation amount of the sheet S during the printing operation can be prevented from occurring.

Second Embodiment

Figure 9:
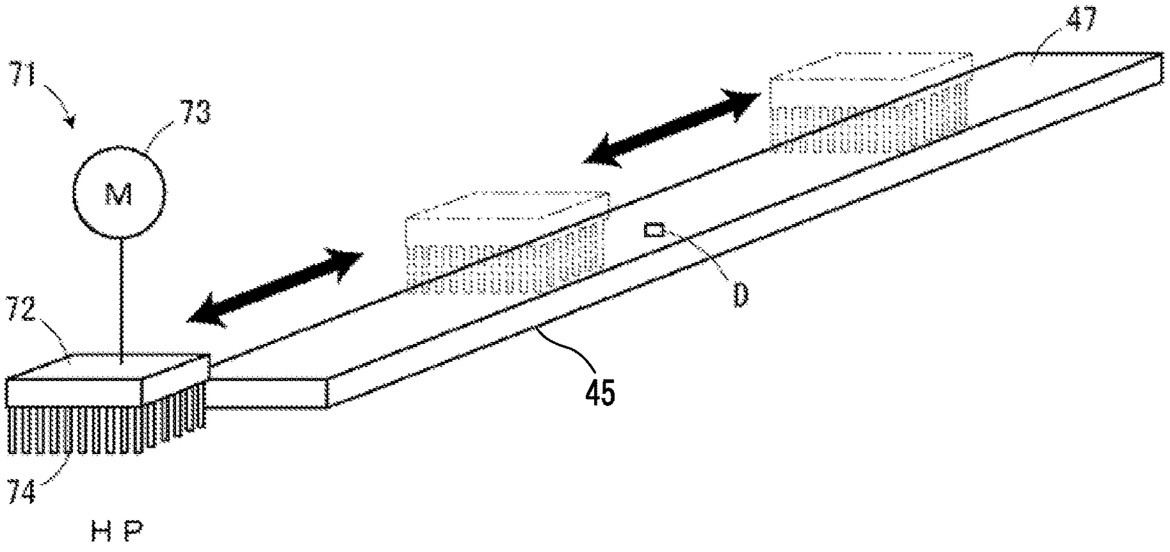
FIG. 9 is a perspective view of a cleanup device in a printer according to a second embodiment.

Subsequently, a printer according to a second embodiment will be described. FIG. 9 is a perspective view of a cleanup device 71 in the printer according to the second embodiment. The cleanup device 71 differs from the cleanup device 61 in that a cleanup body 72 is provided in place of the cleanup roller 62. Descriptions on configurations of the second embodiment that are similar to those of the first embodiment will be omitted.

As shown in FIG. 9, the cleanup device 71 includes the cleanup body 72 and a cleanup motor 73. The cleanup body 72 is movable in the main scanning direction. The cleanup motor 73 causes the cleanup body 72 to reciprocate.

The cleanup body 72 is formed in a square shape in a top view. A cleanup brush 74 having a plurality of bristles is planted on a lower surface of the cleanup body 72. A conveying guide (not shown) that guides conveyance of the sheet S opposes the reading surface 47 of the image sensor 45. A long hole (not shown) that guides a movement of the cleanup body 72 is formed in the conveying guide.

Power of the cleanup motor 73 is transmitted to the cleanup body 72. It is noted that a configuration in which the registration motor 44 usually rotates in the forward direction, and when the registration motor 44 rotates in an opposite direction, power of the registration motor 44 is transmitted to the cleanup body 72, is also possible.

A home position of the cleanup body 72 is set at one end side of the reading surface 47 of the image sensor 45 in the main scanning direction, on an outer side of the conveying path. At the home position, the cleanup body 72 is evacuated from above the reading surface 47 of the image sensor 45.

When the cleanup body 72 is at the home position, a situation where the sheet S being conveyed gets caught in the cleanup brush 74 and a situation where the cleanup brush 74 is sensed by the image sensor 45 are avoided.

It is noted that an absorption sheet may be attached onto a surface of the conveying guide and a portion on an inner side of the guide hole. The absorption sheet prevents the sensing light emitted from the image sensor 45 from being reflected. Black paint may be applied onto the surface of the conveying guide and the portion on the inner side of the guide hole.

When the foreign substance D on the reading surface 47 is sensed based on the output signal of the image sensor 45, the cleanup motor 73 operates, and power of the cleanup motor 73 is transmitted to the cleanup body 72. Thus, the cleanup body 72 moves from the home position to the other end side in the main scanning direction.

A tip end of the cleanup brush 74 comes into sliding contact with the reading surface 47 of the image sensor 45. The foreign substance D is removed from the reading surface 47 by the tip end of the cleanup brush 74. In a state where the foreign substance D is adhered onto the tip end of the cleanup brush 74, the cleanup motor 73 causes the cleanup body 72 to return to the home position on the one end side in the main scanning direction.

It is noted that a cleanup blade (not shown) may be provided near the home position. Moreover, an edge or the like of the reading surface 47 may shear off the foreign substance D from the cleanup brush 74.

The control device 51 may sense the foreign substance D on the reading surface 47 of the image sensor 45 again after the cleanup device 71 has cleaned the reading surface 47 of the image sensor 45. In this case, the cleanup device 71 re-cleans the reading surface 47 of the image sensor 45.

The foreign substance D is removed as the cleanup device 71 repeats the cleaning of the reading surface 47 of the image sensor 45. The foreign substance D may be sensed even when the cleanup device 71 repeats the cleaning of the reading surface 47 of the image sensor 45. In this case, the control device 51 causes the display 52 to display a message indicating information that prompts to check the reading surface 47.

Figure 10:
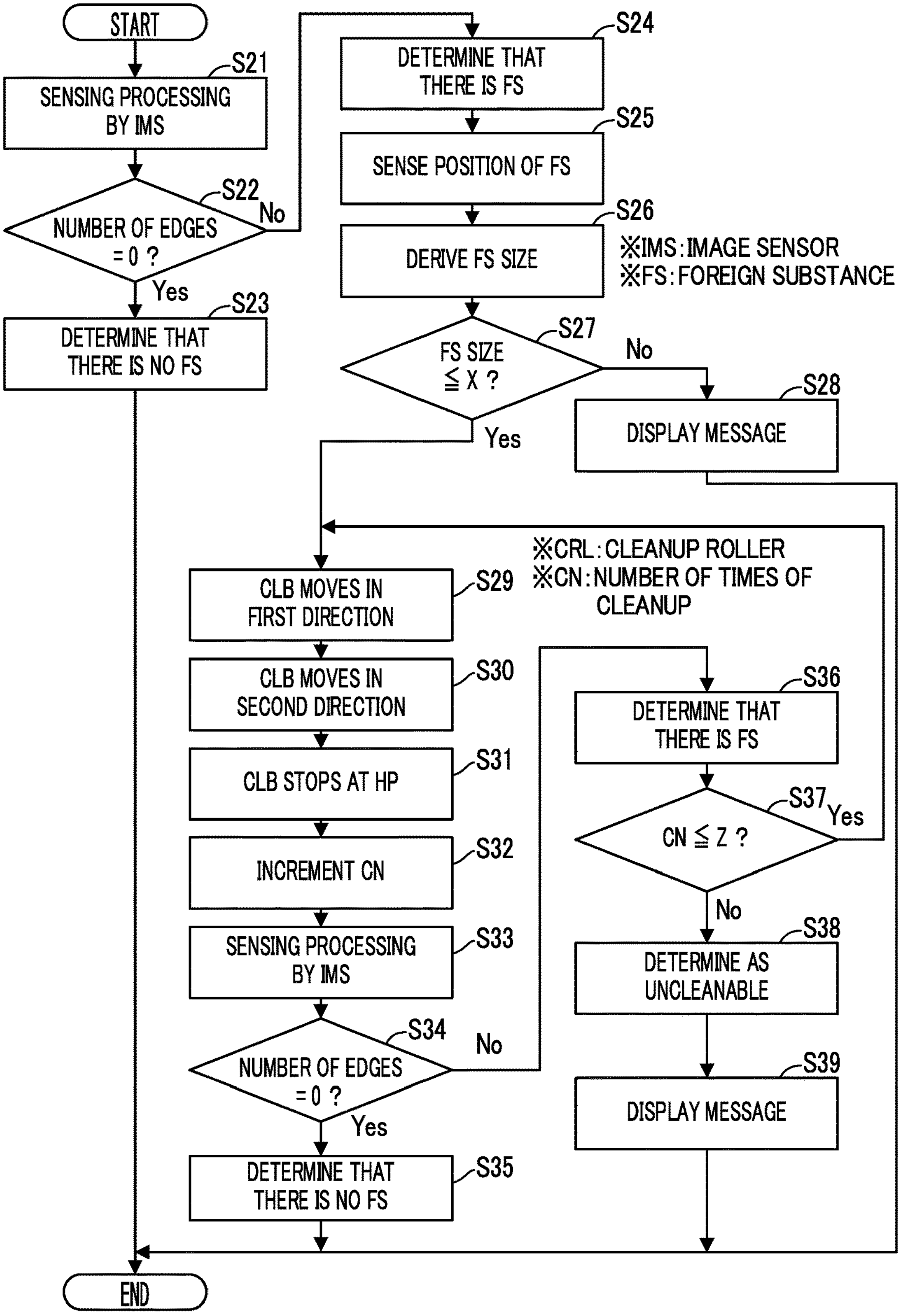
FIG. 10 is a flowchart showing an example of procedures of the cleanup processing in the printer according to the second embodiment.

The cleanup processing will be described with reference to FIG. 10. FIG. 10 is a flowchart showing an example of the cleanup processing in the second embodiment. Hereinafter, the reference symbols shown in FIG. 2 and FIG. 9 will be used in the descriptions as appropriate.

Further, the flowchart shown in FIG. 10 is a mere example and can be changed as appropriate. FIG. 10 shows an example of the sensing processing of a foreign substance D when the sheet S is not conveyed. The sensing processing of a foreign substance D may also be executed when the sheet S is being conveyed.

As shown in FIG. 10, when the sheet S is being conveyed, sensing processing by the image sensor 45 is carried out. Thus, the image sensor 45 outputs a signal to the control device 51 (Step S21).

When the number of edges in the output signal is 0 (Yes in Step S22), the control device 51 determines that there is no foreign substance, and ends the processing (Step S23).

When the number of edges is one or more (No in Step S22), the control device 51 determines that there is a foreign substance (Step S24).

Next, the control device 51 senses a position of the foreign substance D based on the number of clocks between the rising edge of the trigger signal and the rising edge of the output signal (Step S25).

Further, the control device 51 derives a size of the foreign substance based on the number of clocks between the rising edge and the falling edge in the output signal (Step S26). When the foreign substance size is larger than a predetermined size X (No in Step S27), the control device 51 causes the display 52 to display a message that prompts the user to check the reading surface 47 of the image sensor 45 (Step S28). Thus, the foreign substance D that cannot be cleaned by the cleanup body 72 is manually removed from the reading surface 47.

When the foreign substance size is equal to or smaller than the predetermined size X (Yes in Step S27), the control device 51 causes the cleanup motor 73 to positively rotate, to thus cause the cleanup body 72 to move in a first direction along the main scanning direction (Step S29).

When the cleanup body 72 reaches the other end of the reading surface 47, the control device 51 causes the cleanup motor 73 to rotate backwards, to thus cause the cleanup body 72 to move in a second direction along the main scanning direction (Step S30). By the reciprocation of the cleanup body 72, the reading surface 47 of the image sensor 45 is cleaned.

Further the control device 51 causes the cleanup body 72 to stop at the home position (Step S31). Furthermore, the control device 51 increments the number of times of cleanup (Step S32). Moreover, the sensing processing by the image sensor 45 is carried out (Step S33). Thus, the image sensor 45 outputs a signal to the control device 51.

When the number of edges in the output signal is 0 (Yes in Step S34), the control device 51 determines that there is no foreign substance, and ends the processing (Step S35).

When the number of edges is one or more (No in Step S34), the control device 51 determines that there is a foreign substance (Step S36).

When the number of times of cleanup is equal to or smaller than a predetermined number of times of cleanup Z (Yes in Step S37), the control device 51 repeats the processing from Step S29 to Step S34.

When the number of times of cleanup is larger than the predetermined number of times of cleanup Z (No in Step S37), the control device 51 determines that the foreign substance D is uncleanable (Step S38). In addition, the control device 51 causes the display 52 to display a message that prompts the user to check the reading surface 47 of the image sensor 45 (Step S39). Thus, the user is prompted to check a smudge or scratch on the reading surface 47 that cannot be removed by the cleanup body 72, to replace the image sensor 45 or the registration unit 32, and the like. It is noted that also in the second embodiment, arbitrary values can be set for the predetermined size X and the predetermined number of times of cleanup Z.

In the present embodiment, the position of the foreign substance D is sensed (Step S25). The control device 51 may execute priority cleanup processing in which the cleanup body 72 is caused to reciprocate in a partial region including the position of the foreign substance D on the reading surface 47.

Figure 11:
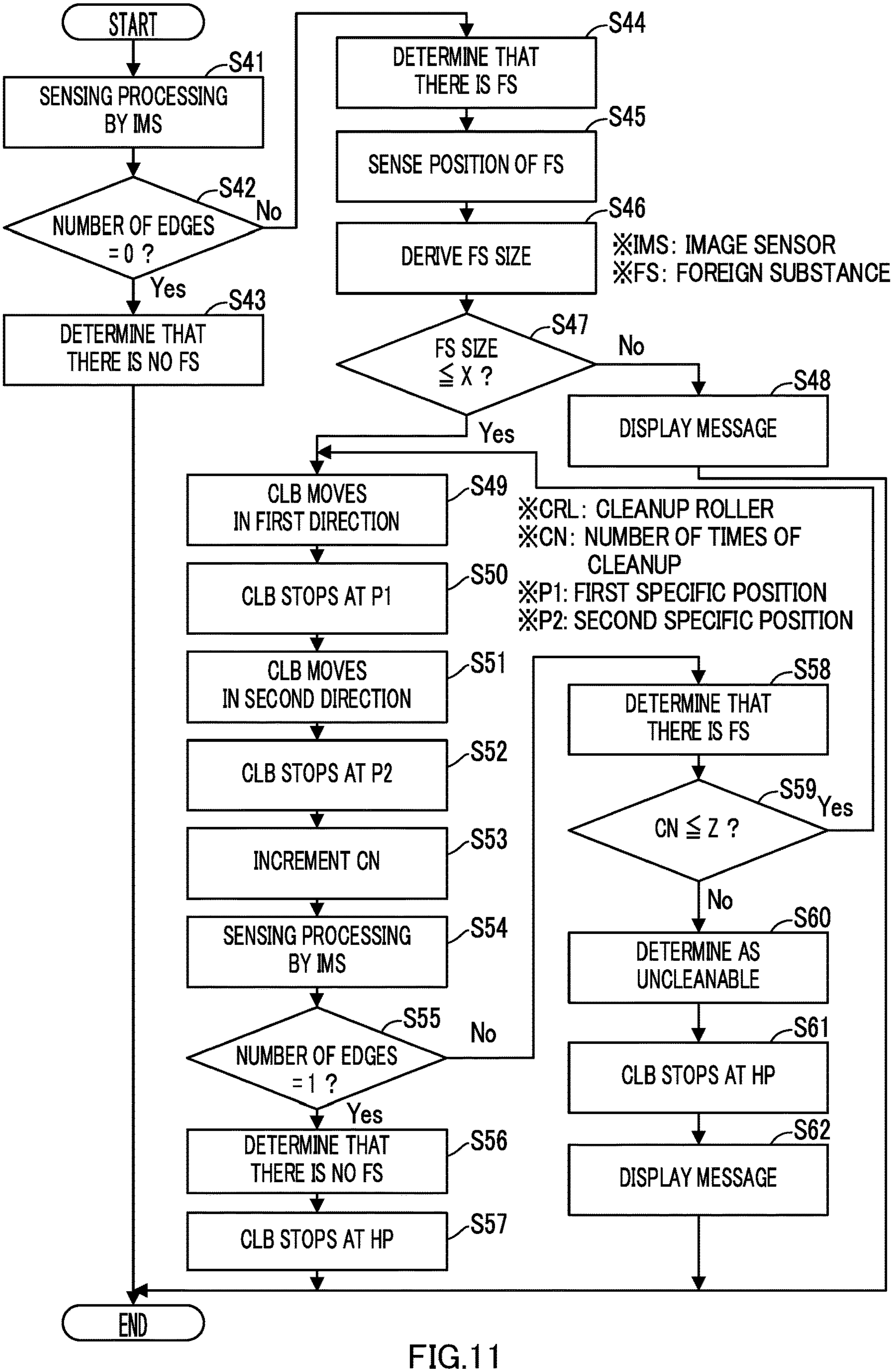
FIG. 11 is a flowchart showing an example of procedures of priority cleanup processing in the printer according to the second embodiment.

Hereinafter, the priority cleanup processing will be described with reference to FIG. 11. FIG. 11 is a flowchart showing an example of procedures of the priority cleanup processing in the second embodiment.

It is noted that in descriptions of FIG. 11, the reference symbols of FIG. 2 and FIG. 9 are used as appropriate. The flowchart shown in FIG. 11 is a mere example and can be changed as appropriate.

FIG. 11 shows an example of the sensing processing of a foreign substance D when the sheet S is not conveyed. The sensing processing of a foreign substance D may also be executed when the sheet S is being conveyed.

As shown in FIG. 11, the processing of Step S41 to Step S48 in the priority cleanup processing is similar to the processing of Step S21 to Step S28 in FIG. 10.

When the foreign substance size is equal to or smaller than the predetermined size X (Yes in Step S47), the control device 51 causes the cleanup motor 73 to positively rotate, to thus cause the cleanup body 72 to move in the first direction along the main scanning direction (Step S49). In addition, the control device 51 causes the cleanup body 72 to stop at a first specific position (Step S50). The first specific position is a position located beyond a sensing position of the foreign substance D that is farthest from the home position, in the first direction.

Next, the control device 51 causes the cleanup motor 73 to rotate backwards, to thus cause the cleanup body 72 to move in the second direction along the main scanning direction (Step S51). Further, the control device 51 causes the cleanup body 72 to stop at a second specific position (Step S52). The second specific position is a position located beyond a sensing position of the foreign substance D that is closest to the home position, in the second direction. Furthermore, the control device 51 increments the number of times of cleanup (Step S53).

After the cleanup body 72 reciprocates once, the sensing processing by the image sensor 45 is carried out (Step S54). Thus, the image sensor 45 outputs a signal to the control device 51 (Step S54).

In the present embodiment, the cleanup body 72 is positioned above the reading surface 47. Therefore, the output signal of the image sensor 45 includes a rising edge that indicates a sensing position of the cleanup body 72. Accordingly, when the number of edges is one (Yes in Step S55), the control device 51 determines that there is no foreign substance (Step S56).

Further, the control device 51 causes the cleanup motor 73 to rotate backwards to thus cause the cleanup body 72 to return to the home position, and ends the processing (Step S57).

On the other hand, when the number of edges is two or more (No in Step S55), the control device 51 determines that there is a foreign substance (Step S58).

Further, when the number of times of cleanup is equal to or smaller than the predetermined number of times of cleanup Z (Yes in Step S59), the control device 51 repeats the processing from Step S49 to Step S55. In this manner, as long as the number of times of cleanup does not exceed the predetermined number of times of cleanup Z, the cleanup device 71 reciprocates in a partial region including the sensing position of the foreign substance D on the reading surface 47 until it is determined that there is no foreign substance. Thus, the position of the foreign substance D on the reading surface 47 of the image sensor 45 is preferentially cleaned by the cleanup body 72.

When the number of times of cleanup exceeds the predetermined number of times of cleanup Z under the situation where it is determined that there is a foreign substance (No in Step S59), the control device 51 determines that the foreign substance D is uncleanable (Step S60). Further, the control device 51 causes the cleanup motor 73 to rotate backwards to thus cause the cleanup body 72 to return to the home position (Step S61).

In addition, the control device 51 causes the display 52 to display a message that prompts the user to check the reading surface 47 of the image sensor 45 (Step S62).

It is noted that when the cleanup body 72 returns to the home position after removing the foreign substance D, there is a fear that the foreign substance D on the cleanup brush 74 will adhere onto the reading surface 47 of the image sensor 45 again. To avoid this, all the steps may be repeated when it is determined that there is no foreign substance (Step S56).

According to the second embodiment, the foreign substance D on the reading surface 47 of the image sensor 45 is removed similar to the first embodiment. Thus, false sensing of the lateral deviation amount of the sheet S during the printing operation can be prevented from occurring. Moreover, the foreign substance D can be removed from the reading surface 47 of the image sensor 45 by the reciprocation of the cleanup body 72.

It is noted that in the present embodiment, the image sensor 45 is disposed on the downstream side of the pair of registration rollers 41 and 42 in the sheet conveying direction (see FIG. 2). However, the image sensor 45 may alternatively be disposed on the upstream side of the pair of registration rollers 41 and 42 in the sheet conveying direction. In this case, coordinates of a front end of the sheet S and a skew amount of the sheet S may be sensed based on the output signals of the image sensor 45. For example, the skew amount is calculated based on a difference between timings at which the front end of the sheet S passes through two points on left and right sides of the image sensor 45.

Also in the present embodiment, the CIS is exemplified as the image sensor 45. However, other image sensors such as a CCD (Charge Coupled Device) sensor may be used as the image sensor.

Moreover, in the present embodiment, the pair of registration rollers 41 and 42 are exemplified as the pair of conveying rollers that convey the sheet to the image transfer position. A pair of non-registration rollers may alternatively be used as the pair of conveying rollers. In other words, in the image forming apparatus, a non-registration unit may be provided in place of the registration unit.

Also in the present embodiment, the lateral deviation of the sheet is corrected by the image forming apparatus. However, the lateral deviation and/or skew of the sheet may alternatively be corrected by the image forming apparatus.

Also in the present embodiment, the display 52 is exemplified as the notification device. However, the notification device is not limited to the display. The notification device may be any device as long as it notifies an error related to the image forming operation of the sheet. For example, the error may be notified by audio or a beeping sound.

Moreover, a control device of an apparatus body may process the output signals of the image sensor 45. Alternatively, a control device of a registration unit different from the control device of the apparatus body may process the output signals of the image sensor 45.

Also in the present embodiment, the printer 1 is exemplified as the image forming apparatus. However, the image forming apparatus is not limited to the printer 1. For example, the image forming apparatus may be a copying machine, a facsimile, or a multifunction peripheral. The multifunction peripheral compositely includes a printing function, a copying function, a facsimile function, and the like.

It is noted that embodiments in which the above-described embodiments and modified examples are wholly or partially combined may also be adopted as embodiments other than the embodiments described above.

Furthermore, the technique of the present disclosure is not limited to the embodiments described above and may be variously changed, substituted, or modified without departing from the gist of the technical idea of the present disclosure. In addition, the technique of the present disclosure may be realized by a different technique that is obtained by a progress of the technique or a different technique derived from the technique.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus capable of correcting a lateral deviation and/or a skew of a sheet, comprising:

a pair of conveying rollers which convey the sheet to a transfer position of an image;

an image sensor which reads the sheet on an upstream side of the transfer position in a sheet conveying direction;

a control device which processes an output signal of the image sensor; and a cleanup device which cleans a reading surface of the image sensor, wherein the image sensor includes a plurality of light-receiving elements arranged along a main scanning direction, the cleanup device includes a cleanup body movable in the main scanning direction, the cleanup device causes the cleanup body to reciprocate, to clean the reading surface of the image sensor, the control device senses a position of a foreign substance on the reading surface of the image sensor as well as calculates a lateral deviation amount and/or a skew amount of the sheet based on the output signal of the image sensor, the control device identifies a first position and a second position that are respective ends of a partial region including the position in the main scanning direction where the foreign substance was detected of an entire region of the reading surface of the imaging sensor, and the control device causes the cleanup device to reciprocate between the first position and the second position.

2. The image forming apparatus according to claim 1, wherein in a case where the output signal obtained during one scan of the image sensor includes a plurality of rising edges or falling edges while the sheet is being conveyed, the control device senses the foreign substance on the reading surface of the image sensor.

3. The image forming apparatus according to claim 1, wherein in a case where the output signal obtained during one scan of the image sensor includes at least one rising edge or falling edge when the sheet is not conveyed, the control device senses the foreign substance on the reading surface of the image sensor.

4. The image forming apparatus according to claim 1, wherein in a case where the control device senses the foreign substance on the reading surface of the image sensor after the cleanup device has cleaned the reading surface of the image sensor, the cleanup device re-cleans the reading surface of the image sensor.

5. The image forming apparatus according to claim 1, wherein the cleanup device includes a cleanup roller which rotates about a rotation shaft arranged along the main scanning direction, and the cleanup device causes the cleanup roller to rotate, to clean the reading surface of the image sensor.

6. The image forming apparatus according to claim 1, further comprising a notification device which notifies information related to an image forming operation, wherein the control device derives a size of the foreign substance based on the output signal of the image sensor, and the control device notifies, in a case where the size of the foreign substance exceeds a predetermined size, information that prompts to check the reading surface of the image sensor via the notification device.

* * * * *